(12) United States Patent
Chen et al.

(10) Patent No.: US 8,458,282 B2
(45) Date of Patent: Jun. 4, 2013

(54) EXTENDED WRITE COMBINING USING A WRITE CONTINUATION HINT FLAG

(75) Inventors: Dong Chen, Croton On Hudson, NY (US); Alan Gara, Mount Kisco, NY (US); Philip Heidelberger, Cortlandt Manor, NY (US); Martin Ohmacht, Yorktown, NY (US); Pavlos Vranas, Danville, CA (US)

(73) Assignee: International Business Machines Corporation, Armonk, NY (US)

( * ) Notice: Subject to any disclaimer, the term of this patent is extended or adjusted under 35 U.S.C. 154(b) by 985 days.

(21) Appl. No.: 11/768,593

(22) Filed: Jun. 26, 2007

(65) Prior Publication Data
US 2009/0006605 A1  Jan. 1, 2009

(51) Int. Cl.
  *G06F 15/167* (2006.01)
  *G06F 15/16* (2006.01)
  *G06F 13/00* (2006.01)
  *G06F 13/28* (2006.01)

(52) U.S. Cl.
  USPC ............ 709/213; 709/250; 711/137; 711/155

(58) Field of Classification Search
  USPC .......... 709/213, 216–219; 711/100, 154–155, 711/157, 159; 708/250
  See application file for complete search history.

(56) References Cited

U.S. PATENT DOCUMENTS

| | | | |
|---|---|---|---|
| 4,777,595 A | 10/1988 | Strecker et al. | |
| 5,063,562 A | 11/1991 | Barzilai et al. | |
| 5,142,422 A | 8/1992 | Zook et al. | |
| 5,349,587 A | 9/1994 | Nadeau-Dostie et al. | |
| 5,353,412 A | 10/1994 | Douglas et al. | |
| 5,452,432 A | 9/1995 | Macachor | |
| 5,524,220 A * | 6/1996 | Verma et al. | 712/207 |
| 5,526,510 A * | 6/1996 | Akkary et al. | 711/133 |
| 5,634,007 A | 5/1997 | Calta et al. | |
| 5,659,710 A | 8/1997 | Sherman et al. | |
| 5,671,444 A * | 9/1997 | Akkary et al. | 710/52 |
| 5,680,572 A * | 10/1997 | Akkary et al. | 711/126 |
| 5,708,779 A | 1/1998 | Graziano et al. | |
| 5,748,613 A | 5/1998 | Kilk et al. | |

(Continued)

OTHER PUBLICATIONS

Information Sciences Institute University of Southern California. "RFC 791—Internet Protocol." Published on Sep. 1981. Retrieved from the Internet on May 31, 2012. <URL: http://tools.ietf.org/html/rfc791>.*

(Continued)

*Primary Examiner* — Joseph Avellino
*Assistant Examiner* — James Baron
(74) *Attorney, Agent, or Firm* — Scully, Scott, Murphy & Presser, P.C.; Daniel P. Morris, Esq.

(57) ABSTRACT

A computing apparatus for reducing the amount of processing in a network computing system which includes a network system device of a receiving node for receiving electronic messages comprising data. The electronic messages are transmitted from a sending node. The network system device determines when more data of a specific electronic message is being transmitted. A memory device stores the electronic message data and communicating with the network system device. A memory subsystem communicates with the memory device. The memory subsystem stores a portion of the electronic message when more data of the specific message will be received, and the buffer combines the portion with later received data and moves the data to the memory device for accessible storage.

9 Claims, 2 Drawing Sheets

U.S. PATENT DOCUMENTS

| | | | |
|---|---|---|---|
| 5,761,464 A | 6/1998 | Hopkins | |
| 5,796,735 A | 8/1998 | Miller et al. | |
| 5,809,278 A * | 9/1998 | Watanabe et al. | 711/150 |
| 5,825,748 A | 10/1998 | Barkey et al. | |
| 5,890,211 A | 3/1999 | Sokolov et al. | |
| 5,917,828 A | 6/1999 | Thompson | |
| 6,023,732 A | 2/2000 | Moh et al. | |
| 6,061,511 A | 5/2000 | Marantz et al. | |
| 6,072,781 A | 6/2000 | Feeney et al. | |
| 6,122,715 A * | 9/2000 | Palanca et al. | 711/154 |
| 6,185,214 B1 | 2/2001 | Schwartz et al. | |
| 6,205,520 B1 * | 3/2001 | Palanca et al. | 711/138 |
| 6,219,300 B1 | 4/2001 | Tamaki | |
| 6,263,397 B1 | 7/2001 | Wu et al. | |
| 6,295,571 B1 | 9/2001 | Scardamalia et al. | |
| 6,311,249 B1 | 10/2001 | Min et al. | |
| 6,324,495 B1 | 11/2001 | Steinman | |
| 6,356,106 B1 | 3/2002 | Greeff et al. | |
| 6,366,984 B1 * | 4/2002 | Carmean et al. | 711/141 |
| 6,442,162 B1 | 8/2002 | O'Neill et al. | |
| 6,466,227 B1 | 10/2002 | Pfister et al. | |
| 6,564,331 B1 | 5/2003 | Joshi | |
| 6,594,234 B1 | 7/2003 | Chard et al. | |
| 6,598,123 B1 | 7/2003 | Anderson et al. | |
| 6,601,144 B1 | 7/2003 | Arimilli et al. | |
| 6,631,447 B1 | 10/2003 | Morioka et al. | |
| 6,647,428 B1 | 11/2003 | Bannai et al. | |
| 6,662,305 B1 | 12/2003 | Salmon et al. | |
| 6,735,174 B1 | 5/2004 | Hefty et al. | |
| 6,775,693 B1 | 8/2004 | Adams | |
| 6,799,232 B1 | 9/2004 | Wang | |
| 6,874,054 B2 | 3/2005 | Clayton et al. | |
| 6,880,028 B2 | 4/2005 | Kurth | |
| 6,889,266 B1 | 5/2005 | Stadler | |
| 6,894,978 B1 | 5/2005 | Hashimoto | |
| 6,954,887 B2 | 10/2005 | Wang et al. | |
| 6,986,026 B2 | 1/2006 | Roth et al. | |
| 7,007,123 B2 | 2/2006 | Golla et al. | |
| 7,058,826 B2 | 6/2006 | Fung | |
| 7,065,594 B2 | 6/2006 | Ripy et al. | |
| 7,143,219 B1 | 11/2006 | Chaudhari et al. | |
| 7,191,373 B2 | 3/2007 | Wang et al. | |
| 7,239,565 B2 | 7/2007 | Liu | |
| 7,280,477 B2 | 10/2007 | Jeffries et al. | |
| 7,298,746 B1 | 11/2007 | De La Iglesia et al. | |
| 7,363,629 B2 | 4/2008 | Springer et al. | |
| 7,373,420 B1 | 5/2008 | Lyon | |
| 7,401,245 B2 | 7/2008 | Fischer et al. | |
| 7,454,640 B1 | 11/2008 | Wong | |
| 7,454,641 B2 | 11/2008 | Connor et al. | |
| 7,461,236 B1 | 12/2008 | Wentzlaff | |
| 7,463,529 B2 | 12/2008 | Matsubara | |
| 7,502,474 B2 | 3/2009 | Kaniz et al. | |
| 7,539,845 B1 | 5/2009 | Wentzlaff et al. | |
| 7,613,971 B2 | 11/2009 | Asaka | |
| 7,620,791 B1 | 11/2009 | Wentzlaff et al. | |
| 7,698,581 B2 | 4/2010 | Oh | |
| 2001/0055323 A1 | 12/2001 | Rowett et al. | |
| 2002/0078420 A1 | 6/2002 | Roth et al. | |
| 2002/0087801 A1 * | 7/2002 | Bogin et al. | 711/137 |
| 2002/0100020 A1 | 7/2002 | Hunter et al. | |
| 2002/0129086 A1 | 9/2002 | Garcia-Luna-Aceves et al. | |
| 2002/0138801 A1 | 9/2002 | Wang et al. | |
| 2002/0156979 A1 * | 10/2002 | Rodriguez | 711/129 |
| 2002/0184159 A1 * | 12/2002 | Tadayon et al. | 705/54 |
| 2003/0007457 A1 * | 1/2003 | Farrell et al. | 370/235 |
| 2003/0028749 A1 | 2/2003 | Ishikawa et al. | |
| 2003/0050714 A1 | 3/2003 | Tymchenko | |
| 2003/0050954 A1 | 3/2003 | Tayyar et al. | |
| 2003/0074616 A1 | 4/2003 | Dorsey | |
| 2003/0105799 A1 | 6/2003 | Khan et al. | |
| 2003/0163649 A1 | 8/2003 | Kapur et al. | |
| 2003/0177335 A1 | 9/2003 | Luick | |
| 2003/0188053 A1 | 10/2003 | Tsai | |
| 2003/0235202 A1 * | 12/2003 | Van Der Zee et al. | 370/428 |
| 2004/0003174 A1 * | 1/2004 | Yamazaki | 711/118 |
| 2004/0003184 A1 | 1/2004 | Safranek et al. | |
| 2004/0019730 A1 | 1/2004 | Walker et al. | |
| 2004/0024925 A1 | 2/2004 | Cypher et al. | |
| 2004/0073780 A1 | 4/2004 | Roth et al. | |
| 2004/0103218 A1 | 5/2004 | Blumrich et al. | |
| 2004/0210694 A1 | 10/2004 | Shenderovich | |
| 2004/0243739 A1 | 12/2004 | Spencer | |
| 2005/0007986 A1 | 1/2005 | Malladi et al. | |
| 2005/0053057 A1 | 3/2005 | Deneroff et al. | |
| 2005/0076163 A1 | 4/2005 | Malalur | |
| 2005/0160238 A1 | 7/2005 | Steely et al. | |
| 2005/0216613 A1 | 9/2005 | Ganapathy et al. | |
| 2005/0251613 A1 | 11/2005 | Kissell | |
| 2005/0270886 A1 | 12/2005 | Takashima | |
| 2005/0273564 A1 * | 12/2005 | Lakshmanamurthy et al. | 711/158 |
| 2006/0050737 A1 | 3/2006 | Hsu | |
| 2006/0080513 A1 | 4/2006 | Beukema et al. | |
| 2006/0206635 A1 | 9/2006 | Alexander et al. | |
| 2006/0248367 A1 | 11/2006 | Fischer et al. | |
| 2007/0055832 A1 * | 3/2007 | Beat | 711/154 |
| 2007/0079044 A1 * | 4/2007 | Mandal et al. | 710/310 |
| 2007/0133536 A1 | 6/2007 | Kim et al. | |
| 2007/0168803 A1 | 7/2007 | Wang et al. | |
| 2007/0174529 A1 | 7/2007 | Rodriguez et al. | |
| 2007/0195774 A1 | 8/2007 | Sherman et al. | |
| 2008/0147987 A1 | 6/2008 | Cantin et al. | |

OTHER PUBLICATIONS

Definition of "mechanism", Oxford English Dictionary, http://dictionary.oed.com/cgi/entry/00304337?query_type=word&queryword=mechanism&first=1&max_to_show=10&sort_type=alpha&result_place=2&search_id=y2atEIGc-11603&hilite+00304337.

Almasi, et al., "MPI on BlueGene/L: Designing an Efficient General Purpose Messaging Solution for a Large Cellular System," IBM Research Report RC22851 (W037-150) Jul. 22, 2003.

Almasi, et al.,"Optimization of MPI Collective Communication on BlueGene/L Systems," ICS'05, Jun. 20-22, 2005, Boston, MA.

Gara, et al., "Overview of the Blue Gene/L system architecture," IBM J. Res. & Dev., vol. 49, No. 2/3, Mar./May 2005, pp. 195-212.

Huang, et al., "Performance Evaluation of Adaptive MPI," PPoPP'06, Mar. 29-31, 2006, New York, New York.

MPI (Message Passing Interface) standards documents, errata, and archives http://www.mpi-forum.org visited Jun. 16, 2007 (Sections 4.2, 4.4 and 10.4).

David Chaiken, Craig Fields, Kiyoshi Kurihara, Anant Agarwal, Directory-Based Cache Coherence in Large-Scale Multiprocessors, Computer, v.23 n. 6, p. 49-58, Jun. 1990.

Michel, Dubois, Christoph Scheurich, Faye A. Briggs, Synchronization, Coherence, and Event Ordering in Multiprocessors, Computer, v.21 n. 2, p. 9-21, Feb. 1988.

Giampapa, et al., "Blue Gene/L advanced diagnostics environment," IBM J. Res. & Dev., vol. 49, No. 2/3, Mar./May 2005, pp. 319-331.

IBM Journal of Research and Development, Special Double Issue on Blue Gene, vol. 49, Nos. 2/3, Mar./May 2005 ("Preface").

IBM Journal of Research and Development, Special Double Issue on Blue Gene, vol. 49, Nos. 2/3, Mar./May 2005 ("Intro").

"Intel 870: A Building Block for Cost-Effective, Scalable Servers", Faye Briggs, Michel et al., pp. 36-47, Mar.-Apr. 2002.

Pande, et al., Performance Evaluation and Design Trade-Offs for Network-On-Chip Interconnect Architectures, 2005, IEEE, pp. 1025-1040.

* cited by examiner

EXTENDED WRITE COMBINING USING A WRITE CONTINUATION HINT FLAG

STATEMENT REGARDING FEDERALLY SPONSORED RESEARCH OF DEVELOPMENT

The U.S. Government has a paid-up license in this invention and the right in limited circumstances to require the patent owner to license others on reasonable terms as provided for by the terms of Contract. No. B554331 awarded by the Department of Energy.

CROSS-REFERENCE TO RELATED APPLICATIONS

The present invention is related to the following commonly-owned, co-pending United States Patent Applications filed on even date herewith, the entire contents and disclosure of each of which is expressly incorporated by reference herein as if fully set forth herein. U.S. patent application Ser. No. 11/768,777, for "A SHARED PERFORMANCE MONITOR IN A MULTIPROCESSOR SYSTEM"; U.S. patent application Ser. No. 11/768,645, for "OPTIMIZED COLLECTIVES USING A DMA ON A PARALLEL COMPUTER"; U.S. patent application Ser. No. 11/768,781, for "DMA SHARED BYTE COUNTERS IN A PARALLEL COMPUTER"; U.S. patent application Ser. No. 11/768,784, for "MULTIPLE NODE REMOTE MESSAGING"; U.S. patent application Ser. No. 11/768,697, for "A METHOD AND APPARATUS OF PREFETCHING STREAMS OF VARYING PREFETCH DEPTH"; U.S. patent application Ser. No. 11/768,532, for "PROGRAMMABLE PARTITIONING FOR HIGH-PERFORMANCE COHERENCE DOMAINS IN A MULTIPROCESSOR SYSTEM"; U.S. patent application Ser. No. 11/768,857, for "METHOD AND APPARATUS FOR SINGLE-STEPPING COHERENCE EVENTS IN A MULTIPROCESSOR SYSTEM UNDER SOFTWARE CONTROL"; U.S. patent application Ser. No. 11/768,547, for "INSERTION OF COHERENCE EVENTS INTO A MULTIPROCESSOR COHERENCE PROTOCOL"; U.S. patent application Ser. No. 11/768,791, for "METHOD AND APPARATUS TO DEBUG AN INTEGRATED CIRCUIT CHIP VIA SYNCHRONOUS CLOCK STOP AND SCAN"; U.S. patent application Ser. No. 11/768,795, for "DMA ENGINE FOR REPEATING COMMUNICATION PATTERNS"; U.S. patent application Ser. No. 11/768,799, for "METHOD AND APPARATUS FOR A CHOOSE-TWO MULTI-QUEUE ARBITER"; U.S. patent application Ser. No. 11/768,800, for "METHOD AND APPARATUS FOR EFFICIENTLY TRACKING QUEUE ENTRIES RELATIVE TO A TIMESTAMP"; U.S. patent application Ser. No. 11/768,572, for "BAD DATA PACKET CAPTURE DEVICE"; U.S. patent application Ser. No. 11/768,805, for "A SYSTEM AND METHOD FOR PROGRAMMABLE BANK SELECTION FOR BANKED MEMORY SUBSYSTEMS"; U.S. patent application Ser. No. 11/768,905, for "AN ULTRASCALABLE PETAFLOP PARALLEL SUPERCOMPUTER"; U.S. patent application Ser. No. 11/768,810, for "SDRAM DDR DATA EYE MONITOR METHOD AND APPARATUS"; U.S. patent application Ser. No. 11/768,812, for "A CONFIGURABLE MEMORY SYSTEM AND METHOD FOR PROVIDING ATOMIC COUNTING OPERATIONS IN A MEMORY DEVICE"; U.S. patent application Ser. No. 11/768,559, for "ERROR CORRECTING CODE WITH CHIP KILL CAPABILITY AND POWER SAVING ENHANCEMENT"; U.S. patent application Ser. No. 11/768,552, for "STATIC POWER REDUCTION FOR MIDPOINT-TERMINATED BUSSES"; U.S. patent application Ser. No. 11/768,527, for "COMBINED GROUP ECC PROTECTION AND SUB-GROUP PARITY PROTECTION"; U.S. patent application Ser. No. 11/768,669, for "A MECHANISM TO SUPPORT GENERIC COLLECTIVE COMMUNICATION ACROSS A VARIETY OF PROGRAMMING MODELS"; U.S. patent application Ser. No. 11/768,813, for "MESSAGE PASSING WITH A LIMITED NUMBER OF DMA BYTE COUNTERS"; U.S. patent application Ser. No. 11/768,619, for "ASYNCRONOUS BROADCAST FOR ORDERED DELIVERY BETWEEN COMPUTE NODES IN A PARALLEL COMPUTING SYSTEM WHERE PACKET HEADER SPACE IS LIMITED"; U.S. patent application Ser. No. 11/768,682, for "HARDWARE PACKET PACING USING A DMA IN A PARALLEL COMPUTER"; and U.S. patent application Ser. No. 11/768,752, for "POWER THROTTLING OF COLLECTIONS OF COMPUTING ELEMENTS".

FIELD OF THE INVENTION

The present invention relates generally to data processing systems, and more particularly, relates to write combining and pre-fetching in computer memory systems.

BACKGROUND OF THE INVENTION

Packet based network devices receive electronic messages or streams as sequences of packets. A packet is a formatted block of data carried by a computer network. Data from packets may be aligned arbitrarily when stored in memory causing fractions of cache memory lines to be written at packet boundaries. These fractions can cause expensive Read-Modify-Write (RMW) cycles to read the data, modify it, and then write the data back to memory. Further, write combining buffers may store these fractions and combine them with cache line fractions provided by subsequent packets from the same stream or message.

However, packets of a stream or message may be interleaved with packets from other streams or messages, separating accesses that could be write-combined, and thus reducing the probability of write-combining due to premature eviction of fractions from the write-combining buffer. Also, other store traffic, e.g., stores from a local processor, may use the write combining buffers, separating write-combinable accesses even further.

Therefore, a need exists for a method and/or apparatus to reduce interleaving packets of a stream or message and reduce separating write-combinable accesses. Moreover, it would be desirable for a method and/or apparatus to reduce the amount of Read-Modify-Write cycles caused by the alignment of packet boundaries when storing data in memory.

SUMMARY OF THE INVENTION

In an aspect of the present invention, a computing apparatus for reducing the amount of processing in a network computing system which includes a network system device of a receiving node for receiving electronic messages including data. The electronic messages are transmitted from a sending node, and the network system device determines when more data of a specific electronic message is being transmitted. A memory device stores the electronic message data and communicates with the network system device. A memory subsystem communicates with the memory device, and the memory subsystem stores a portion of the electronic message when more data of the specific message is being transmitted. The buffer combines the portion with later received data and moves the combined data to the memory device for accessible storage.

In a related aspect, the processor moves the data to the memory device using a Read-Modify-Write cycle.

In a related aspect, the memory subsystem includes a buffer.

In a related aspect, the memory subsystem includes a write combining buffer.

In a related aspect, the network system device includes a computer program for determining when more data is being transmitted of the specific electronic message.

In a related aspect, the network system device includes a hardware device for determining when more data is being transmitted of a specific electronic message.

In a related aspect, the electronic message includes an indicator communicating to the network system device that more data is being transmitted after the network system device receives the specific electronic message.

In a related aspect, the indicator is a write continuation flag indicating a write continuation.

In a related aspect, the flag tags a last portion of the electronic message to indicate to the memory subsystem to store the last portion longer than non-tagged portions.

In a related aspect, the apparatus further including a prefetch device executing a fetch of metadata upon initiation from the network system device for a next electronic message being stored in the memory device.

In a related aspect the memory device includes cache memory.

In a related aspect, the electronic messages include data packets.

In a related aspect, the network system device of the receiving node communicates with a communication link communicating with the sending node.

In a related aspect, the network system device is a computer having a processor.

In another aspect, a method for producing a computing apparatus for reducing the amount of processing in a network computing system comprises receiving electronic messages including data on a receiving node; transmitting the electronic messages from a sending node; determining when more data of a specific electronic message is being transmitted; storing the electronic message data; storing a portion of the electronic message when more data of the specific message is being transmitted; and combining the portion with later received data and moving the combined data to the memory device for accessible storage.

In a related aspect, the method further includes fetching metadata for a next electronic message being stored in a memory device.

BRIEF DESCRIPTION OF THE DRAWINGS

These and other objects, features and advantages of the present invention will become apparent from the following detailed description of illustrative embodiments thereof, which is to be read in connection with the accompanying drawings, in which.

DETAILED DESCRIPTION OF THE INVENTION

Figure 1:
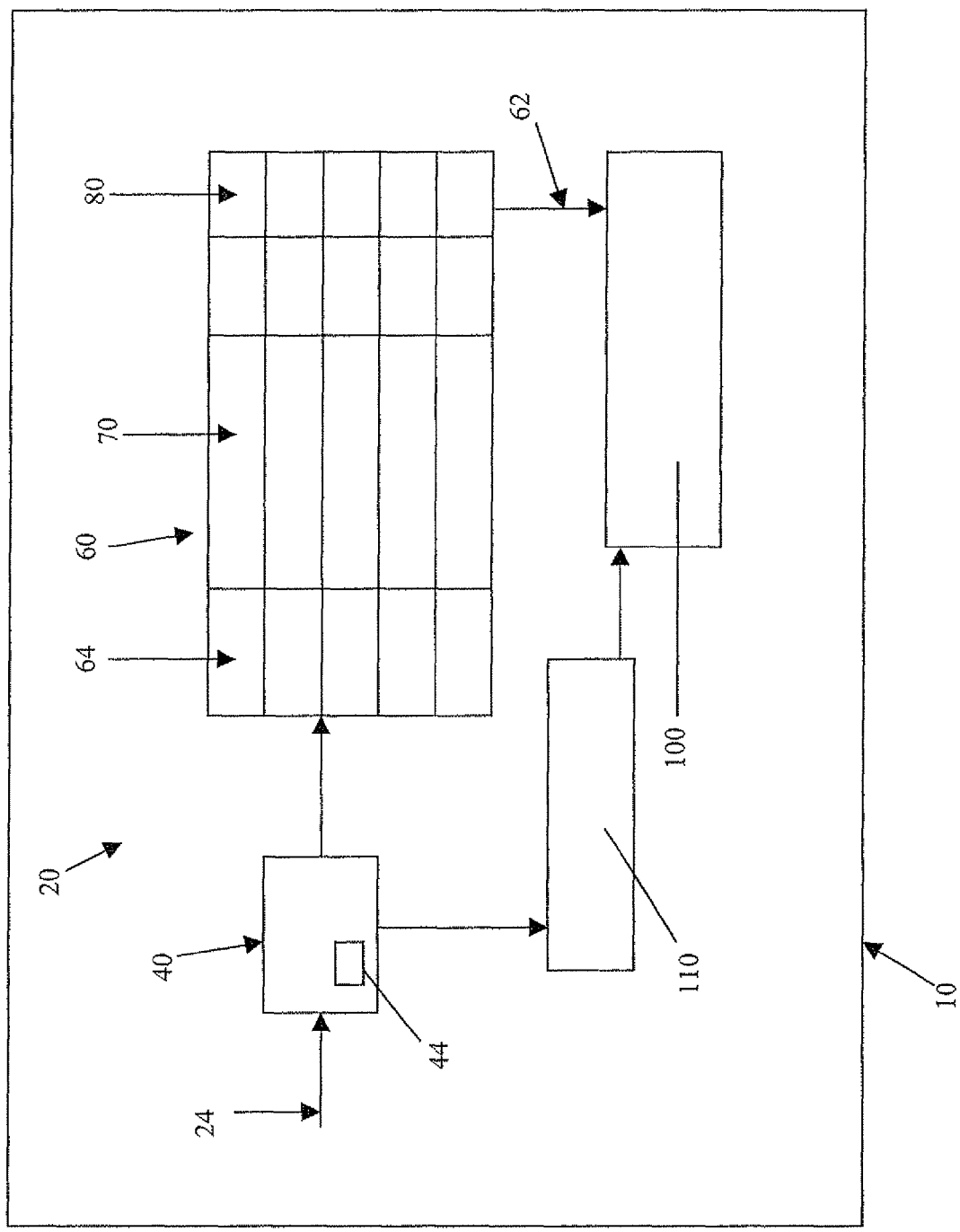
FIG. 1 is a block diagram according to an embodiment of the invention depicting a receiving node including a computing apparatus having a communication link, a processor, a memory device and a memory subsystem.

An illustrative embodiment of a computing apparatus 20 according to the present invention and shown in FIG. 1 includes a bi-directional communication link 24 connecting a network computing system including sending and receiving nodes. A node is defined herein as a point in a communication topology where data packets being carried through the bi-directional communication link are stored in a memory device for further processing, which may include, for example, reading, modifying, and writing to the memory device. A sending node or other nodes in the network computing system, which are not shown in the figures, are envisioned to be of like composition with the receiving node 10 shown in FIG. 1. A node may include, for example, a processor, a computer system, a server, or a router. A link 24 software protocol includes instructions for the transmission and receiving of packets. The receiving node 10 includes a network interface/system device embodied as a processor 40 communicating with link 24, and the network system device or processor 40 includes a hardware device 44 for determining when more data is being transmitted of a specific electronic message.

The processor 40 further communicates with a memory subsystem embodied as a write combining buffer 60. The write combining buffer is adapted to hold packet information including addresses, 64, a write continuation flag 70, and data 80. The buffer 60 holds a data packet while waiting for more packet data of the same message to be received. The buffer 60 communicates 62 with a memory device embodied as cache memory 100 for storing the data transmitted. The buffer 60 can execute a Read-Modify-Write command to the cache memory when it cannot combine a packet fraction with further write data.

Figure 2:
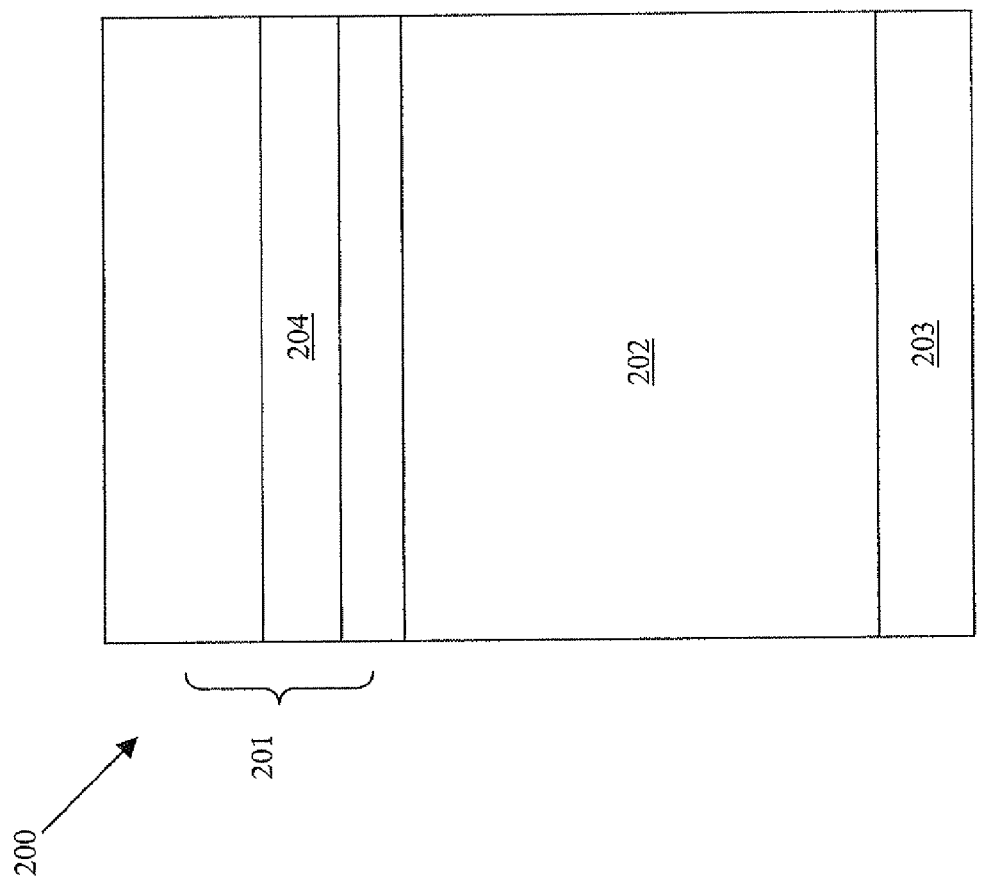
FIG. 2 is block diagram of a representative data packet structure received by the computing apparatus depicted in FIG. 1.

An example of a data packet format is shown in FIG. 2. A packet 200 includes a packet header 201, a packet data payload 202 and a packet cyclic redundancy check (CRC) verification 203. A sending node implements the CRC verification by computing the packet CRC to verify that the data is valid or good before transmitting the data packet. Each packet has a link level sequence number 204 in the packet header 201. The sequence number 204 is incremented for every subsequent packet transmitted over the link 24.

In operation, referring to FIG. 1, a data packet 200 of a stream or message is transmitted by a sending network device (not shown) and received by the processor 40. The packet can either contain sender-provided information that more packets of the message or stream will be received, or the receiver can, based on its message completion detection method, determine if further packets are expected. When the data stream or message is not continuous, the information that more data packets of the message are being transmitted or intended to be transmitted is communicated or handed-off along with the packet data from the processor 40 as a write continuation flag 70 (or high bit) to a memory subsystem device embodied as a write combining buffer 60. The buffer 60 stores the packet data 80 into the cache memory 100 except for the last fraction or portion of the packet if more packet data will be received. In this case, the last fraction of the received data packet is stored into the write combining buffer 60 and held active for combination with later received packet data of the same message. The buffer 60 holds the data packet 200 components including the data 80, the address 64, and the write continuation flag 70. The flag 70 sent along with packet data 80 indicates a write continuation and is used to tag the write buffer entry. This causes the replacement policy of the buffer 60 to keep the data active longer than other line fragments, thereby allowing time for the buffer 60 to receive more data packets of the same message. Expensive Read-Modify-Write cycles are only required if the fragment cannot be combined with subsequent packets even with the extended active time in the buffer. This can occur for example if the delivery of the next packet is severely delayed by exceptional events including link errors and exception processing on the sending node.

The write continuation information is also useful when retrieving metadata from the cache memory device 100 upon initiation from the processor 40 needed for the reception of the next packet. Metadata is data about a data packet which is descriptive information about a set of data, e.g., control information about whether to verify checksums of the packet, whether to discard a packet upon detection of an incorrect checksum or whether to notify a processor about the arrival of the packet. The memory subsystem buffer 60 uses the write continuation information to direct pre-fetch hardware 110 to fetch the metadata from main memory for the next packet and store it in the cache memory 100. This is beneficial as it reduces the time to retrieve the metadata when the next packet arrives, as it is then readily available in the cache memory 100, shortening overall packet processing time.

The illustrative embodiment of the apparatus 10 reduces the amount of Read-Modify-Write cycles to a memory device. Numerous Read-Modify-Write (RMW) cycles are caused by the alignment of packet boundaries when storing the packet to the cache memory 100. The RMW cycles are reduced by communicating message continuation information along with packet data, thus, extending the active time of the fragment in the write combining buffer, and increasing the probability of write combining. More specifically, the processor must initiate and execute a Read-Modify-Write command as new packets of data are received for the same message. The apparatus of the present invention reduces the amount of Read-Modify-Write cycles by explicitly signaling or flagging to the write combing buffer 60 that a write continuation is likely to occur in the near future and to wait for additional data packets 200 before writing the data associated with the flagged message to the cache memory 100, thereby changing the replacement policy decisions of the write combining buffer 60.

While the present invention has been particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

What is claimed is:

1. A computing apparatus for reducing the amount of processing in a network computing system, comprising:
   a network system device of a receiving node for receiving electronic messages including data, the electronic messages being transmitted from a sending node, and the network system device determining when more data of a specific electronic message is being transmitted;
   a memory device for storing the electronic message data and communicating with the network system device;
   a memory subsystem communicating with the memory device, and the memory subsystem storing a portion of the electronic message when more data of the specific message is being transmitted, a buffer included in the memory subsystem wherein the buffer includes a first holding time for storing non tagged data, the buffer combining the portion with later received data and moving the combined data to the memory device for accessible storage;
   a pre-fetch device for pre-fetching identified metadata stored in the memory device from a selected data packet of the electronic message using the network system device, the identified metadata being additionally stored in a cache memory, the identified metadata being stored in the cache memory and being used when the buffer combines the portion with the later received data; and
   a flag being included in the specific electronic message being transmitted from the sending node, the flag indicating that more data of the specific electronic message is being transmitted, the flag tagging the stored data in the buffer resulting in the tagged stored data being stored for a second holding time, and the second holding time being greater than the first holding time for non tagged stored data;
   wherein, after the second holding time has elapsed, a processor moves the tagged stored data from the buffer to the memory device using a Read-Modify-Write cycle.

2. The apparatus of claim 1, wherein the network system device includes a computer program for determining when more data is being transmitted of the specific electronic message.

3. The apparatus of claim 1, wherein the network system device includes a hardware device for determining when more data is being transmitted of a specific electronic message.

4. The apparatus of claim 1, wherein the electronic message includes an indicator communicating to the network system device that more data is being transmitted after the network system device receives the specific electronic message.

5. The apparatus of claim 4, wherein the indicator is a write continuation flag indicating a write continuation.

6. The apparatus of claim 5, wherein the flag tags a last portion of the electronic message to indicate to the memory subsystem to store the last portion longer than non-tagged portions.

7. The apparatus of claim 1, wherein the network system device of the receiving node communicates with a communication link communicating with the sending node.

8. The apparatus of claim 1, wherein the network system device is a computer having a processor.

9. A method for producing a computing apparatus for reducing the amount of processing in a network computing system, comprising:
   receiving electronic messages including data on a receiving node;
   transmitting the electronic messages from a sending node;
   determining when more data of a specific electronic message is being transmitted;
   storing the electronic message data;
   storing a portion of the electronic message when more data of the specific message is being transmitted using a buffer included in a memory device wherein the buffer includes a first holding time for storing non tagged data;
   combining the portion with later received data and moving the combined data to the memory device for accessible storage;
   identifying metadata stored in the memory device from a selected data packet of the electronic message;
   executing a pre-fetch of the identified metadata using a pre-fetch device and a network system device;

storing the identified metadata in a cache memory for a predetermined amount of time for use when combining the portion with the later received data, the pre-fetch being executed before the step of combining the portion with later received data;

transmitting a flag included in the specific electronic message transmitted from the sending node, the flag indicating that more data of the specific electronic message is being transmitted;

tagging the stored data in the buffer using the flag; and storing the tagged stored data for a second holding time, and the second holding time being greater than the first holding time for the non tagged stored data;

wherein, after the second holding time has elapsed, the tagged stored data is moved from the buffer to the memory device using a Read-Modify-Write cycle.

* * * * *